(12) United States Patent
DeMonner et al.

(10) Patent No.: US 11,392,483 B2
(45) Date of Patent: Jul. 19, 2022

(54) DYNAMIC LIBRARY REPLACEMENT TECHNIQUE

(71) Applicant: Metawork Corporation, Wilmington, DE (US)

(72) Inventors: Nicholas DeMonner, Redwood City, CA (US); David Marcin, Saratoga, CA (US); David Michael Renie, Atherton, CA (US); Margaret Henry, Redwood City, CA (US)

(73) Assignee: Metawork Corporation, Wilmington, DE (US)

( * ) Notice: Subject to any disclaimer, the term of this patent is extended or adjusted under 35 U.S.C. 154(b) by 0 days.

(21) Appl. No.: 16/931,112

(22) Filed: Jul. 16, 2020

(65) Prior Publication Data

US 2022/0019517 A1 Jan. 20, 2022

(51) Int. Cl.
*G06F 9/44* (2018.01)
*G06F 11/36* (2006.01)
(Continued)

(52) U.S. Cl.
CPC .......... *G06F 11/3636* (2013.01); *G06F 8/433* (2013.01); *G06F 11/3466* (2013.01)

(58) Field of Classification Search
CPC ... G06F 11/3636; G06F 8/433; G06F 11/3466
See application file for complete search history.

(56) References Cited

U.S. PATENT DOCUMENTS

| | | |
|---|---|---|
| 6,918,065 B1 | 7/2005 | Edwards |
| 7,555,549 B1 | 6/2009 | Campbell |

(Continued)

FOREIGN PATENT DOCUMENTS

| | | |
|---|---|---|
| WO | WO-2007044875 A2 | 4/2007 |
| WO | WO-2014204996 A1 | 12/2014 |

OTHER PUBLICATIONS

Jimborean, Alexandra et al. "VMAD: An Advanced Dynamic Program Analysis and Instrumentation Framework" Mar. 24, 2012, ICIAP, 17th Intern'l Conference Proceedings, 20 pages.

(Continued)

*Primary Examiner* — Hang Pan
(74) *Attorney, Agent, or Firm* — Cesari and McKenna, LLP

(57) ABSTRACT

A dynamic library replacement technique enables replacement of original functions or methods of application libraries based on analysis of traces captured by a client library of an investigative platform. Traces captured from the user application are analyzed to identify the original methods of the user application that may be replaced by the client library. The original methods may be identified based on estimated performance improvements determined from the analysis of the captured traces. The improved method replacements and estimated performance improvements may be graphically presented to a user via a user interface (UI) infrastructure of the investigative platform. Replacement of the improved methods may be defined in the dynamic configuration or interactively via the UI infrastructure and continued performance monitoring reported. The specific performance for any method may be monitored along with a fidelity of the monitored method. For pure functions (methods) without side-effects, the improved replacement method and original application method may be compared for the same data.

20 Claims, 6 Drawing Sheets

(51) Int. Cl.
*G06F 8/41* (2018.01)
*G06F 11/34* (2006.01)

(56) References Cited

U.S. PATENT DOCUMENTS

| | | | |
|---|---|---|---|
| 8,151,255 B2 | 4/2012 | Gustafson | |
| 9,323,652 B2 | 4/2016 | Garrett | |
| 10,372,586 B2 | 8/2019 | Hulick, Jr. | |
| 2002/0087949 A1 | 7/2002 | Golender | |
| 2003/0088854 A1 | 5/2003 | Wygodny | |
| 2004/0054992 A1* | 3/2004 | Nair | G06F 8/443 |
| | | | 717/138 |
| 2005/0223048 A1 | 10/2005 | Smith et al. | |
| 2005/0261879 A1 | 11/2005 | Shrivastava et al. | |
| 2006/0070027 A1 | 3/2006 | Schmelter | |
| 2006/0101440 A1* | 5/2006 | Stay | G06F 8/443 |
| | | | 717/151 |
| 2006/0112312 A1 | 5/2006 | Dickenson | |
| 2006/0242627 A1 | 10/2006 | Wygodny | |
| 2007/0033578 A1* | 2/2007 | Arnold | G06F 9/45504 |
| | | | 717/130 |
| 2008/0155342 A1 | 6/2008 | O'Callahan | |
| 2008/0168433 A1* | 7/2008 | Arnold | G06F 11/3688 |
| | | | 717/158 |
| 2008/0313618 A1 | 12/2008 | Broman | |
| 2009/0007075 A1 | 1/2009 | Edmark | |
| 2009/0089800 A1 | 4/2009 | Jones | |
| 2009/0249285 A1 | 10/2009 | Li | |
| 2009/0327650 A1* | 12/2009 | Neuerburg | G06F 9/328 |
| | | | 711/219 |
| 2011/0067008 A1 | 3/2011 | Srivastava | |
| 2011/0087927 A1 | 4/2011 | Arnold et al. | |
| 2011/0209119 A1* | 8/2011 | Duesterwald | G06F 8/72 |
| | | | 717/122 |
| 2011/0213894 A1 | 9/2011 | Silberstein | |
| 2013/0246001 A1 | 9/2013 | Uchida | |
| 2013/0283102 A1 | 10/2013 | Krajec | |
| 2013/0283281 A1 | 10/2013 | Krajec et al. | |
| 2014/0317603 A1 | 10/2014 | Gataullin et al. | |
| 2014/0331092 A1 | 11/2014 | Taylor et al. | |
| 2015/0066881 A1 | 3/2015 | Sundaram | |
| 2015/0347273 A1 | 12/2015 | Krajec | |
| 2016/0197847 A1 | 7/2016 | Astley | |
| 2016/0202960 A1 | 7/2016 | Minh Le | |
| 2018/0150384 A1 | 5/2018 | Alaranta et al. | |

OTHER PUBLICATIONS

J. Mertz and I. Nunes "On the Practical Feasibility of Software Monitoring: a Framework for Low-Impact Execution Tracing," 2019 IEEE/ACM 14th International Symposium on Software Engineering for Adaptive and Self-Managing Systems (SEAMS) pp. 169-180.

Morajko et al. "Design and Implementation of Dynamic Tuning Environment", Journal of Parallel and Distributed Computing, vol. 67, No. 4, Mar. 24, 2007, pp. 0474-0490.

PCT Notification of Transmittal of the International Search Report and the Written Opinion of the International Searching Authority, or the Declaration, International Searching Authority, International Application No. PCT/US2021/039576, dated Oct. 28, 2021, 16 pages.

M. Wagner and A. Knüpfer, "Automatic Adaption of the Sampling Frequency for Detailed Performance Analysis," 17th IEEE/ACM International Symposium on Cluster, Cloud and Grid Computing (CCGRID), 2017, pp. 973-981.

\* cited by examiner

DYNAMIC LIBRARY REPLACEMENT TECHNIQUE

BACKGROUND

Technical Field

The present disclosure relates to software application development and production and, more specifically, to an investigative platform having observability tools configured to diagnose and solve errors associated with software application development and production.

Background Information

Conventional observability tools are typically used in both software development and production environments to infer internal states of an executing software application (e.g., executable code) from knowledge of external outputs. However, these tools generally have a limited view/observation of information for a user (software developer) to obtain sufficient information (e.g., internal state information) about executable code to correctly diagnose a malfunction. That is, the tools typically collect information, such as logs, metrics and traces, from the executable code at runtime with insufficient detail and independently. As a result, an integrated view of sufficient fidelity across the collected information is not possible to aid the malfunction diagnosis, especially with respect to a historical view of specific operations manifesting the malfunction. For example, the tools may capture exceptions raised by the executable code that indicate a malfunction, but the root cause may be buried in a history of specific data values and processing leading to the exception. As such, examining a voluminous history of invocations and data changes across the collected information is often necessary to successfully diagnose the malfunction. Moreover, in production these tools are not generally configured for arbitrarily detailed information capture in an "always on" manner, but rather are typically used for testing or similar short-lived activities and then turned off.

Often, user applications written in interpreted (i.e., managed) programming languages (such as Ruby and Python) employ methods/functions implemented in native (e.g., unmanaged) code for generic operations (e.g., string operations, etc.) because of the substantial performance improvement that those implementations provide over equivalent methods/functions implemented with language runtime systems (e.g., interpreters) which adversely affect (e.g., slow) code execution. As used herein, native code is unmanaged programming code (such as, e.g., C or C++) that is compiled to native computer/machine code (i.e., machine code). The native code typically has identical functionality to the user application code but with superior performance characteristics. For example, an arithmetic operation that adds two numbers (e.g., A+B) implemented in the C programming language typically translates (i.e., compiles) into a single machine instruction executed on a processor of the computer/machine. In contrast, the same operation in an interpreted programming language (e.g., Ruby or Python) may require levels of indirection and processing (e.g., parsing, just-in-time compilation) to determine, e.g., the data types of A and B, as well as the semantic context for the symbol "+" (e.g., in the code "A+B") prior to execution. However, conventional approaches require predetermining the performance benefit of deploying replacement libraries used by the application code, which may be costly and burdensome as well as being difficult in production environments.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
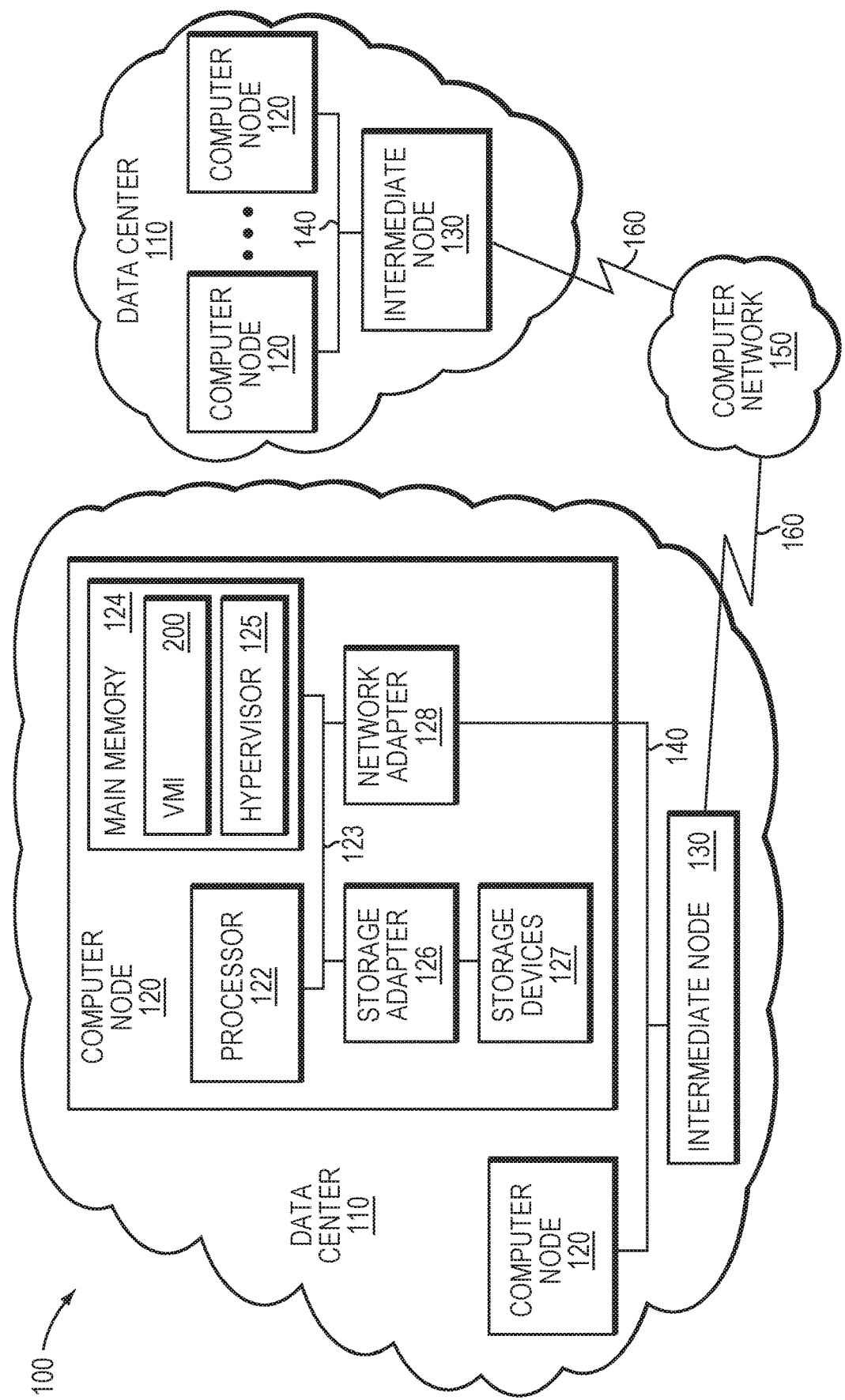
FIG. 1 is a block diagram of a virtualized computing environment.

The embodiments described herein are directed to a dynamic library replacement technique configured to enable replacement of original functions or methods of application libraries based on analysis (e.g., comparative performance) of traces captured by a client library of an investigative platform. The client library is loaded in a user application executing on a virtual machine instance of a virtualized computing environment or, for other embodiments, on an actual computer/machine. The client library interacts with a separate agent process of the platform to instrument executable code (e.g., symbolic text, interpreted bytecodes, machine code and the like visible to the client library) of the user application and, to that end, loads a capture configuration (dynamic configuration) that specifies information such as, inter alia, methods and associated arguments, variables and data structures (values), to instrument. The client library inspects the executable code to determine portions of the code to instrument based on rules or heuristics of the dynamic configuration, which represent a degree of fidelity (e.g., a frequency) of the executable code and information to trace at runtime. Capture points of the runtime application are implemented as callback functions (callbacks) to the client library, which are registered with a runtime system executing the user application.

Illustratively, the client library may examine a language runtime stack and associated call history during a capture interval, i.e., a method execution event triggering the callback, and gather symbolic information, e.g., symbols and associated source code (when available) from the runtime system, invocations of methods, arguments/variables (including local and instance variables) and return values of the methods, as well as performance information (such as entry/exit timestamps to determine execution time) and any exceptions raised based on a capture filter. In an embodiment, the capture filter is a table having identifiers associated with the methods to instrument, such that presence of a particular identifier in the table results in trace capture of the method associated with the identifier during the capture interval. When an exception is raised, the client library captures detailed information for every method in the stack, even if it was not instrumented in detail initially. The client library may also inspect language runtime internals to determine values of data structures used by the application. In an embodiment, the dynamic configuration for data structures involves walking the structures based on a defined level of nesting (e.g., depth of the data structures) which may be specified per data structure type, instance, method, and the like. All gathered information and executed executable code are transferred to the agent process via shared memory and/or Inter Process Communication (such as message passing via sockets, pipes and the like) to isolate the capture from the executing user application. The captured trace information may be reported graphically and interactively to a user via a user interface (UI) infrastructure of the investigative platform.

In an embodiment, traces captured from the user application are analyzed (e.g., comparative performance) to identify the original methods of the user application that may be replaced by the client library of the investigative platform, by third-party libraries with pre-determined performance profiles or by improved user-implemented libraries with historic performance profiles. Analysis may involve traces and historic performance profiles from multiple user applications. The original methods deemed for replacement may be identified based on estimated performance improvements determined from the comparative performance analysis of the captured traces with pre-determined performance profiles of the client library and the third-party libraries. The improved method replacements (from the client and third-party libraries as well as the improved user libraries) and estimated performance improvements may be graphically presented to the user via a user interface (UI) infrastructure of the investigative platform. Notably, the comparative performance may include execution time of the user application methods/functions relative to the replacement libraries as well as other criteria, such as memory utilization, input/output utilization, kernel execution time, etc. For pure functions (methods) without side-effects, the comparative performance may be applied for the same data resulting in precise performance comparisons.

Replacement of the improved methods may be defined in the dynamic configuration, which may be provisioned interactively via the UI infrastructure on a per-method, per-library or per-group basis, or as specified by the agent after retrieving a configuration file, an environment variable, etc. or from a configuration service and/or applied according to a pattern match (e.g., regular expressions) for individual methods, groups of methods or whole libraries (e.g., "digest*"). When the dynamic configuration changes, the client library loads and applies the dynamic configuration, including which original or replacement method/function a given method/function call should invoke. As such, the technique permits runtime method and library replacement without interrupting the user application (e.g., halting the application process) or production environment. The replacement libraries may continue to be monitored with performance reported including continued comparative performance with the replaced user application methods based on historical trace captures. Specific performance for any method may be monitored according to a fidelity (e.g., comparative performance improvement, such as average speedup, min/max, etc.) of the monitored method.

DESCRIPTION

The disclosure herein is generally directed to an investigative platform having observability tools that enable software developers to monitor, investigate, diagnose and remedy errors as well as other deployment issues including code review associated with application development and production. In this context, an application (e.g., a user application) denotes a collection of interconnected software processes or services, each of which provides an organized unit of functionality expressed as instructions or operations, such as symbolic text, interpreted bytecodes, machine code and the like, which is defined herein as executable code and which is associated with and possibly generated from source code (i.e., human readable text written in a high-level programming language) stored in repositories. The investigative platform may be deployed and used in environments (such as, e.g., production, testing, and/or development environments) to facilitate creation of the user application, wherein a developer may employ the platform to provide capture and analysis of the operations (contextualized as "traces") to aid in executable code development, debugging, performance tuning, error detection, and/or anomaly capture managed by issue.

In an exemplary embodiment, the investigative platform may be used in a production environment which is executing (running) an instance of the user application. The user application cooperates with the platform to capture traces (e.g., execution of code and associated data/variables) used to determine the cause of errors, faults and inefficiencies in the executable code and which may be organized by issue typically related to a common root cause. To that end, the investigative platform may be deployed on hardware and software computing resources, ranging from laptop/notebook computers, desktop computers, and on-premises ("on-prem") compute servers to, illustratively, data centers of virtualized computing environments.

FIG. 1 is a block diagram of a virtualized computing environment 100. In one or more embodiments described herein, the virtualized computing environment 100 includes one or more computer nodes 120 and intermediate or edge nodes 130 collectively embodied as one or more data centers 110 interconnected by a computer network 150. The data centers may be cloud service providers (CSPs) deployed as private clouds or public clouds, such as deployments from Amazon Web Services (AWS), Google Compute Engine (GCE), Microsoft Azure, typically providing virtualized resource environments. As such, each data center 110 may be configured to provide virtualized resources, such as virtual storage, network, and/or compute resources that are accessible over the computer network 150, e.g., the Internet. Each computer node 120 is illustratively embodied as a computer system having one or more processors 122, a main memory 124, one or more storage adapters 126, and one or more network adapters 128 coupled by an interconnect, such as a system bus 123. The storage adapter 126 may be configured to access information stored on storage devices 127, such as magnetic disks, solid state drives, or other similar media including network attached storage (NAS) devices and Internet Small Computer Systems Interface (iSCSI) storage devices. Accordingly, the storage adapter 126 may include input/output (I/O) interface circuitry that couples to the storage devices over an I/O interconnect arrangement, such as a conventional peripheral component interconnect (PCI) or serial ATA (SATA) topology.

The network adapter 128 connects the computer node 120 to other computer nodes 120 of the data centers 110 over local network segments 140 illustratively embodied as shared local area networks (LANs) or virtual LANs (VLANs). The network adapter 128 may thus be embodied as a network interface card having the mechanical, electrical and signaling circuitry needed to connect the computer node 120 to the local network segments 140. The intermediate node 130 may be embodied as a network switch, router, firewall or gateway that interconnects the LAN/VLAN local segments with remote network segments 160 illustratively embodied as point-to-point links, wide area networks (WANs), and/or virtual private networks (VPNs) implemented over a public network (such as the Internet). Communication over the network segments 140, 160 may be effected by exchanging discrete frames or packets of data according to pre-defined protocols, such as the Transmission Control Protocol/Internet Protocol (TCP/IP) and the User Datagram Protocol (UDP), although other protocols, such as the OpenID Connect (OIDC) protocol, the HyperText Transfer Protocol Secure (HTTPS), HTTP/2, and the Google Remote Procedure Call (gRPC) protocol may also be advantageously employed.

The main memory 124 includes a plurality of memory locations addressable by the processor 122 and/or adapters for storing software programs (e.g., user applications, processes and/or services) and data structures associated with the embodiments described herein. As used herein, a process (e.g., a user mode process) is an instance of a software program (e.g., a user application) executing in the operating system. The processor and adapters may, in turn, include processing elements and/or circuitry configured to execute the software programs, including an instance of a virtual machine and a hypervisor 125, and manipulate the data structures. The virtual machine instance (VMI) 200 is managed by the hypervisor 125, which is a virtualization platform configured to mask low-level hardware operations and provide isolation from one or more guest operating systems executing in the VMI 200. In an embodiment, the hypervisor 125 is illustratively the Xen hypervisor, although other types of hypervisors, such as the Hyper-V hypervisor and/or VMware ESX hypervisor, may be used in accordance with the embodiments described herein. As will be understood by persons of skill in the art, in other embodiments, the instance of the user application may execute on an actual (physical) machine.

It will be apparent to those skilled in the art that other types of processing elements and memory, including various computer-readable media, may be used to store and execute program instructions pertaining to the embodiments described herein. Also, while the embodiments herein are described in terms of software programs, processes, services and executable code stored in memory or on storage devices, alternative embodiments also include the code, services, processes and programs being embodied as logic, components, and/or modules consisting of hardware, software, firmware, or combinations thereof.

Figure 2:
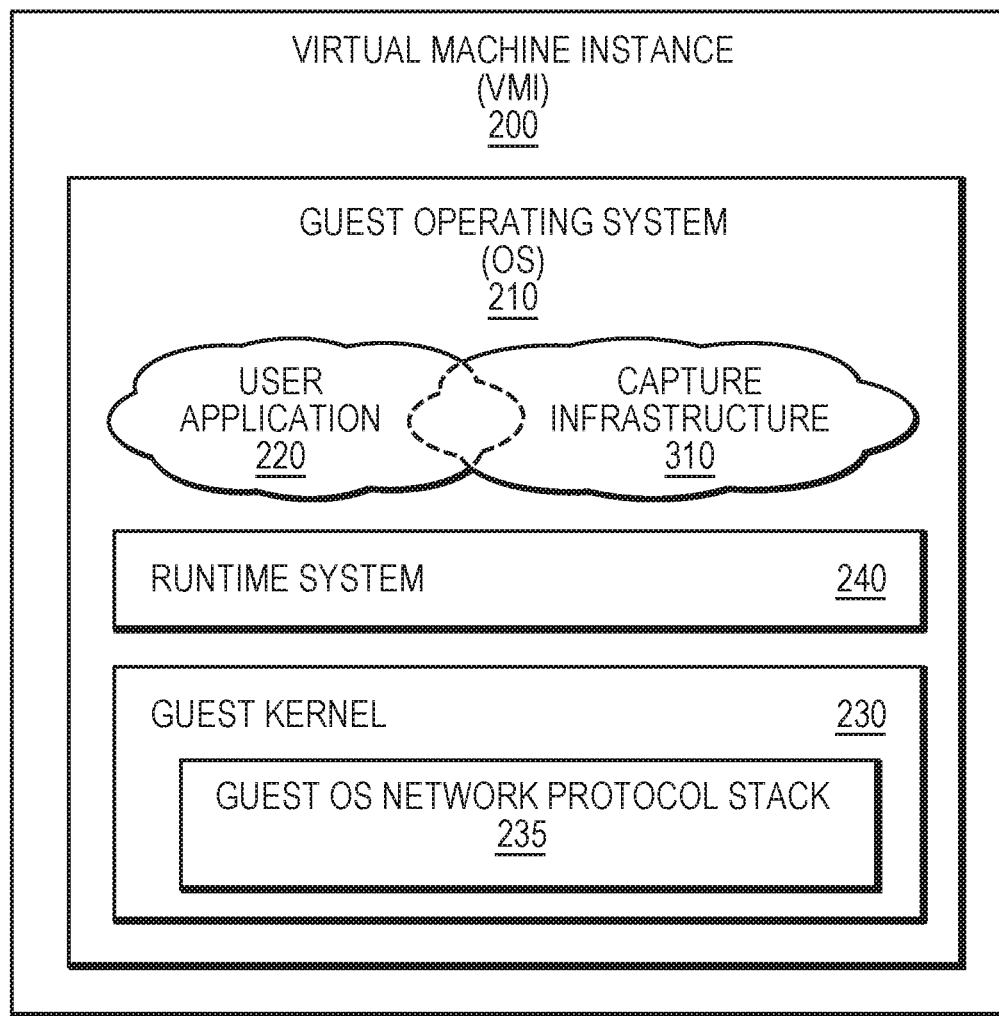
FIG. 2 is a block diagram of the virtual machine instance.

FIG. 2 is a block diagram of the virtual machine instance (VMI) 200. In an embodiment, guest operating system (OS) 210 and associated user application 220 may run (execute) in the VMI 200 and may be configured to utilize system (e.g., hardware) resources of the data center 110. The guest OS 210 may be a general-purpose operating system, such as FreeBSD, Microsoft Windows®, macOS®, and similar operating systems; however, in accordance with the embodiments described herein, the guest OS is illustratively the Linux® operating system. A guest kernel 230 of the guest OS 210 includes a guest OS network protocol stack 235 for exchanging network traffic, such as packets, over computer network 150 via a network data path established by the network adapter 128 and the hypervisor 125. Various data center processing resources, such as processor 122, main memory 124, storage adapter 126, and network adapter 128, among others, may be virtualized for the VMI 200, at least partially with the assistance of the hypervisor 125. The hypervisor may also present a software interface for processes within the VMI to communicate requests directed to the hypervisor to access the hardware resources.

A capture infrastructure 310 of the investigative platform may be employed (invoked) to facilitate visibility of the executing user application 220 by capturing and analyzing traces of the running user application, e.g., captured operations (e.g., functions and/or methods) of the user application and associated data/variables (e.g., local variables, passed parameters/arguments, etc.) In an embodiment, the user application 220 may be created (written) using an interpreted programming language such as Ruby, although other compiled and interpreted programming languages, such as C++, Python, Java, PHP, and Go, may be advantageously used in accordance with the teachings described herein. Illustratively, the interpreted programming language has an associated runtime system 240 within which the user application 220 executes and may be inspected. The runtime system 240 provides application programming interfaces (APIs) to monitor and access/capture/inspect (instrument) operations of the user application so as to gather valuable information or "signals" from the traces (captured operations and associated data), such as arguments, variables and/or values of procedures, functions and/or methods. A component of the capture infrastructure (e.g., a client library) cooperates with the programming language's runtime system 240 to effectively instrument (access/capture/inspect) the executable code of the user application 220.

As described further herein, for runtime systems 240 that provide first-class support of callback functions ("callbacks"), callbacks provided by the client library may be registered by the user application process of the guest OS 210 when the executable code is loaded to provide points of capture for the running executable code. Reflection capabilities of the runtime system 240 may be used to inspect file path(s) of the executable code and enumerate the loaded methods at events needed to observe and capture the signals. Notably, a fidelity of the captured signals may be configured based on a frequency of one or more event-driven capture intervals and/or a selection/masking of methods/functions to capture, as well as selection/masking, type, degree and depth of associated data to capture. The event-driven intervals invoke the callbacks, which filter information to capture. The events may be triggered by method invocation, method return, execution of a new line of code, raising of exceptions, and periodic (i.e., time based). For languages that do not provide such first-class callback support, a compiler may be modified to insert callbacks as "hooks" such that, when processing the executable code, the modified compiler may generate code to provide initial signals passed in the callbacks to the client library, as well as to provide results from the callbacks to the client library. In other embodiments, the callbacks may be added at runtime, by employing proxy methods (i.e., wrapping invocations of the methods to include callbacks at entry and/or exit of the methods) in the executable code. Moreover, the client library (which is contained in the same process running the user application 220) may examine main memory 124 to locate and amend (rewrite) the executable code and enable invocation of the callbacks to facilitate instrumentation on behalf of the investigative platform.

Figure 3:
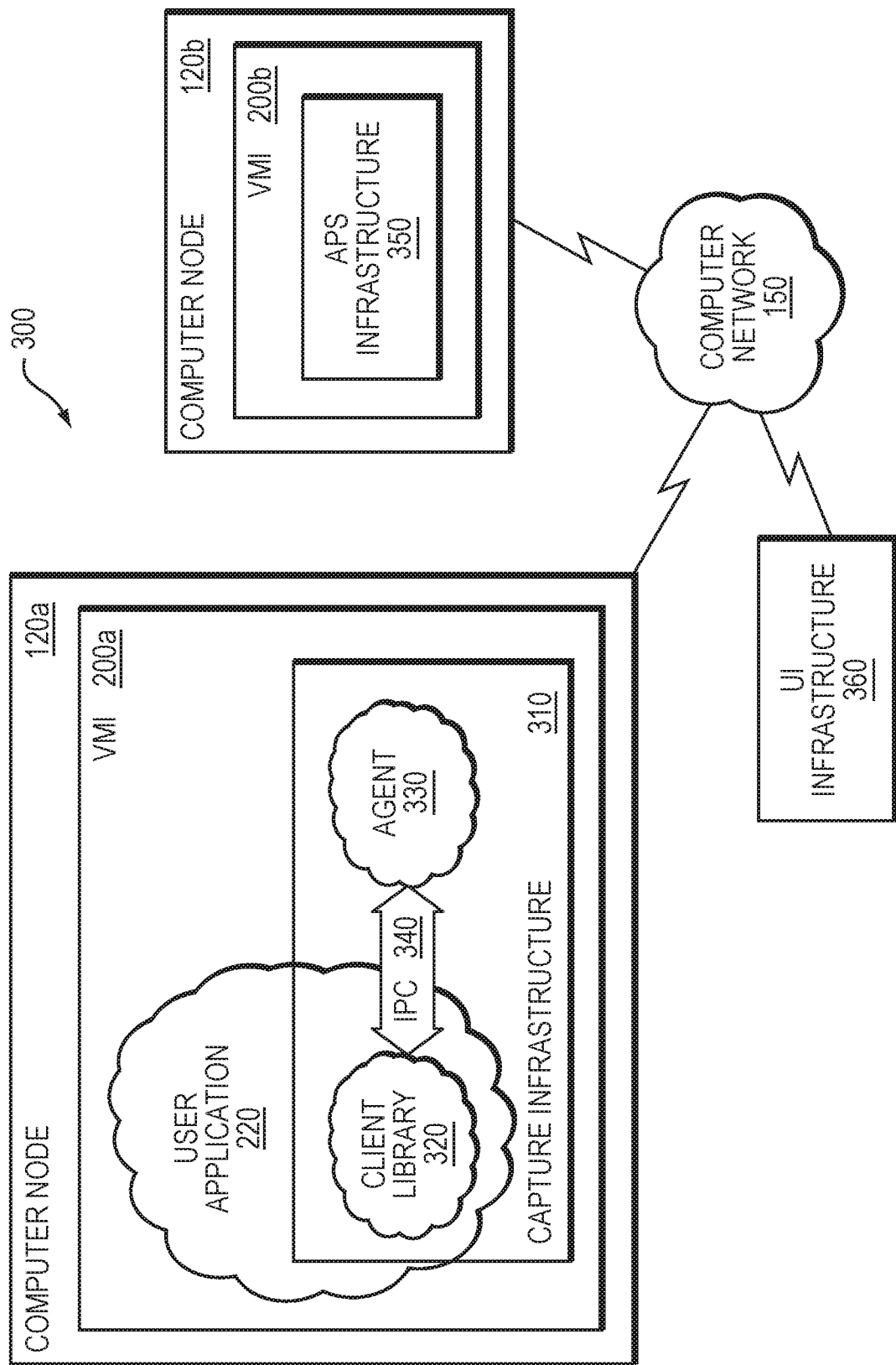
FIG. 3 is a block diagram of an investigative platform.

FIG. 3 is a block diagram of the investigative platform 300. In one or more embodiments, the investigative platform 300 includes the capture infrastructure 310 in communication with (e.g. connected to) an analysis and persistent storage (APS) infrastructure 350 as well as a user interface (UI) infrastructure 360 via computer network 150. Illustratively, the capture infrastructure 310 includes a plurality of components, such as the client library 320 and an agent 330, that interact (e.g., through the use of callbacks) to instrument the running executable code visible to the client library, initially analyze traces captured through instrumentation, compress and thereafter send the traces via the computer network 150 to the APS infrastructure 350 for comprehensive analysis and storage. The APS infrastructure 350 of the investigative platform 300 is configured to provide further multi-faceted and repeatable processing, analysis and organization, as well as persistent storage, of the captured traces. The UI infrastructure 360 allows a user to interact with the investigative platform 300 and examine traces via comprehensive views distilled by the processing, analysis and organization of the APS infrastructure 350. The capture infrastructure 310 illustratively runs in a VMI 200a on a computer node 120a that is separate and apart from a VMI 200b and computer node 120b on which the APS infrastructure 350 runs. Note, however, that the infrastructures 310 and 350 of the investigative platform 300 may run in the same or different data center 110.

In an embodiment, the client library 320 may be embodied as a software development kit (SDK) that provides a set of tools including a suite of methods that software programs, such as user application 220, can utilize to instrument and analyze the executable code. The client library 320 illustratively runs in the same process of the user application 220 to facilitate such executable code instrumentation and analysis (work). To reduce performance overhead costs (e.g., manifested as latencies that may interfere with user application end user experience) associated with executing the client library instrumentation in the user application process, i.e., allocating the data center's processing (e.g., compute, memory and networking) resources needed for such work, the client library queries the runtime system 240 via an API to gather trace signal information from the system, and then performs a first dictionary compression and passes the compressed signal information to an agent 330 executing in a separate process. The agent 330 is thus provided to mitigate the impact of work performed by the client library 320, particularly with respect to potential failures of the user application.

Illustratively, the agent 330 is spawned as a separate process of the guest OS 210 to the user application 220 and provides process isolation to retain captured traces in the event of user process faults, as well as to prevent unexpected processing resource utilization or errors from negatively impacting execution of the user application 220. As much processing as possible of the captured traces of the executable code is offloaded from the client library 320 to the agent 330 because overhead and latency associated with transmission of information (e.g., the captured traces) between operating system processes is minimal as compared to transmission of the information over the computer network 150 to the APS infrastructure 350. In an embodiment, the client library 320 and agent 330 may communicate (e.g., transmit information) via an Inter Process Communication (IPC) mechanism 340, such as shared memory access or message passing of the captured trace signals. Thereafter, the agent 330 may perform further processing on the captured traces, such as a second dictionary compression across captured traces, and then send the re-compressed captured traces to the APS infrastructure 350 of the investigative platform 300 over the computer network 150 for further processing and/or storage.

The embodiments described herein are directed to a dynamic configuration trace capture technique configured to enable software developers to monitor, diagnose and solve errors associated with application development and production. A user links the client library 320 to the user application 220, e.g., after the client library is loaded into a process of the application and, thereafter, the client library (at initialization and thereafter on-demand) loads a dynamic configuration that specifies information such as, inter alia, methods and associated arguments, variables and data structures (values) to instrument as well as a fidelity of capture (i.e., a frequency and degree or amount of the information detail to gather of the running application) expressed as rules. Essentially, the dynamic configuration acts as a filter to define the type and degree of information to capture. The client library 320 inspects the executable code to determine portions of the code to instrument based on the rules or heuristics of the dynamic configuration. Capture points of the runtime application are implemented as callbacks to the client library 320 which, as noted, are registered with the runtime system executing the user application 220 and invoked according to the dynamic configuration. The dynamic configuration may be loaded from various sources, such as from the agent 330, the APS infrastructure 350, and/or via user-defined sources such as files, environment variables and graphically via the UI infrastructure 360.

Figure 4:
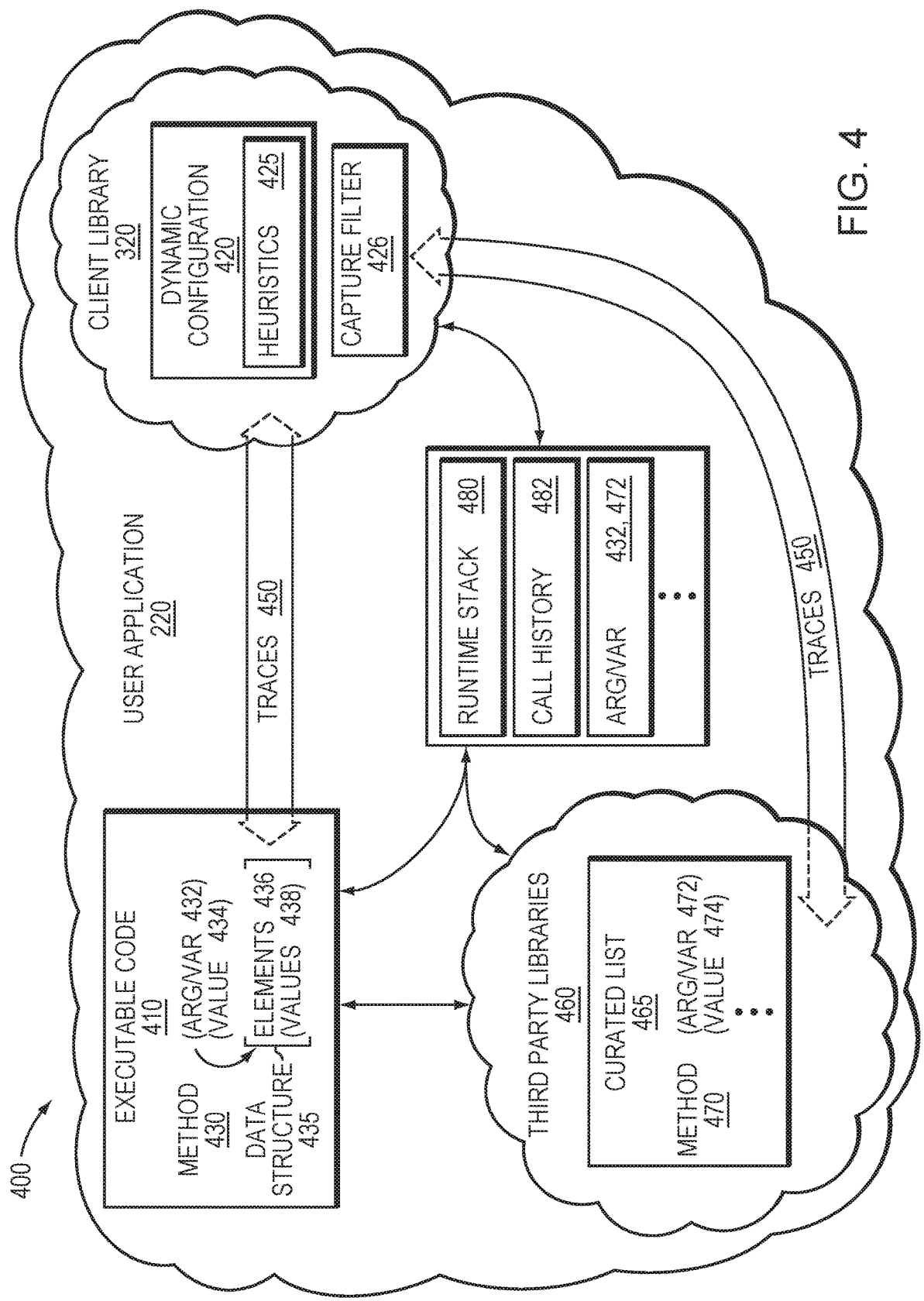
FIG. 4 illustrates a workflow for instrumenting executable code using a dynamic configuration.

FIG. 4 illustrates a workflow 400 for instrumenting executable code 410 using a dynamic configuration 420 in accordance with the instrumentation trace capture technique. Since there is only a finite amount of processing resources available for the client library 320 to perform its work, the technique improves the use of the processing resources in accordance with the dynamic configuration 420, which represents a degree of fidelity of executable code 410 and information to capture at runtime as traces of the executing methods and data of the executable code. In one or more embodiments, default rules or heuristics 425 of the configuration 420 are employed to dynamically capture the traces 450, wherein the default heuristics 425 may illustratively specify capture of (i) all methods 430 of the executable code 410 as well as (ii) certain dependencies on one or more third-party libraries 460 that are often mis-invoked (i.e., called with incorrect parameters or usage). A capture filter 426 is constructed (i.e., generated) from the dynamic configuration based on the heuristics. Changes to the dynamic configuration 420 may be reloaded during the capture interval and the capture filter re-generated. In this manner, the executable code 410 may be effectively re-instrumented on-demand as the capture filter screens the traces 450 to capture.

Illustratively, the capture filter 426 may be embodied as a table having identifiers associated with methods to instrument, such that presence of a particular identifier in the table results in trace capture of the method associated with the identifier during the capture interval. That is, the capture filter is queried (e.g., the capture table is searched) during the capture interval to determine whether methods of the event driving the capture interval are found. If the method is found in the capture filter 426, a trace 450 is captured (i.e., recorded). Notably the method identifiers may depict the runtime system representation of the method (e.g., symbols) or a memory address for a compiled user application and runtime environment. In an embodiment, the capture filter may be extended to include capture filtering applied to arguments, variables, data structures and combinations thereof.

A default dynamic configuration is based on providing a high fidelity (i.e., capture a high trace detail) where there is a high probability of error. As such, the dynamic configuration may trade-off "high-signal" information (i.e., information very useful to debugging, analyzing and resolving errors) against consistently capturing a same level of detail of all invoked methods. For example, the third-party libraries 460 (such as, e.g., a standard string library or regular expression library) are typically widely used by software developers and, thus, are generally more reliable and mature than the user application 220 but are also likely to have incorrect usage by the user application. As a result, the heuristics 425 primarily focus on methods 430 of the user application's executable code 410 based on the assumption that it is less developed and thus more likely where errors or failures are to arise. The heuristics 425 (and capture filter 426) are also directed to tracing invocation of methods of the third-party libraries 460 by the user application via a curated list 465 of methods 470 of the third-part library having arguments/variables (arg/var) 472 and associated values 474 deemed as valuable (high-signal) for purposes of debugging and analysis. Notably the curated list 465 may be folded into the capture filter 426 during processing/loading of the dynamic configuration 420. That is, the curated list includes high-signal methods of the third-party library most likely to be mis-invoked (e.g., called with incorrect calling parameters) and, thus, benefits debugging and analysis of the user application 220 that uses the curated high-signal method. The technique utilizes the available processing resources to capture these high-signal method/value traces 450.

Illustratively, the client library 320 may examine a language runtime stack 480 and associated call history 482 using, e.g., inspection APIs, to query the runtime system during a capture interval to gather symbolic information, i.e., symbols and associated source code (when available), from the runtime system 240, invocations of methods 430, 470, associated arguments/variables 432, 472 (including local and instance variables), return values 434, 474 of the methods, and any exceptions being raised. Notably, the gathered symbolic information of a captured trace may include one or more of (i) high-level programming text processed by the runtime system, which may be derived (generated) from source code stored in repositories; and (ii) symbols as labels representing one or more of the methods, variables, data and state of the executable code. When an exception is raised, the client library 320 captures detailed information for every method in the stack 480, even if was not instrumented in detail initially as provided in the dynamic configuration 420. That is, fidelity of trace capture is automatically increased (e.g., from a first level to a second level) during the capture interval in response to detecting a raised exception. Note that in some embodiments, this automatic increase in trace capture detail may be overridden (superseded) in the dynamic configuration by a manual override. In some embodiments, the runtime system executable code 410 may have limited human readability (i.e., may not be expressed in a high-level programming language) and, in that event, mapping of symbols and references from the executable code 410 to source code used to generate the executable code may be gathered from the repositories by the APS infrastructure 350 and associated with the captured trace.

The client library 320 may also inspect language runtime internals to determine values of data structures used by the application 220. In an embodiment, the dynamic configuration 420 for data structures may involve "walking" the structures and capturing information based on a defined level of nesting (e.g., a nested depth of the data structures) which may be specified per data structure type, instance and/or method as provided in the dynamic configuration 420. As stated previously for language implementations that do not provide first-class callback support, a compiler may be modified to insert callbacks as "hooks" such that, when processing the executable code 410, the modified compiler may generate code to provide initial signals passed in the callbacks to the client library 320 which may inspect the stack 480 directly (e.g., examine memory locations storing the stack). In other embodiments, the client library may add callbacks at runtime in the executable code via proxy methods (i.e., wrapping invocations of the methods to include the callbacks at entry and/or exit of the methods).

In an embodiment, the client library 320 may re-load the dynamic configuration 420 during the callbacks at the capture points, which may change the heuristics 425 to, for example, adjust the frequency of tracing a method and its associated information (e.g., local variables, etc.) and/or selection/masking of methods/functions to capture, as well as selection/masking, type, degree and depth of associated data to capture. The re-loaded dynamic configuration 420 may be defined per method 430, argument/variable 432, and/or data structure 435. Processing decisions regarding adjustments to the dynamic configuration 420 may be performed by the agent 330 and/or APS infrastructure 350, which are pushed to the dynamic configuration 420 and then loaded (i.e., read) by the client library 320 at an event. In an embodiment, the client library 320 has sufficient functionality to perform the trace captures, and capture filtering decisions regarding, e.g., the level of nesting performed by the client library 320 and the definition of a high-signal method for configuration, may be determined and adjusted by the agent 330 and/or APS infrastructure 350, which then push changes in the dynamic configuration to the client library. If a push mechanism is unavailable, the client library 320 can poll periodically for configuration updates. As a result, the client library 320 is configured to perform minimal processing and analysis, whereas most substantive processing (either diagnostically or heuristically) is performed by the agent (a first stage of analysis, subject to constraints of complexity) or the APS infrastructure (a second stage of analysis having generally a greater complexity than the first stage performed in the agent). Notably, the technique enables optional overrides, by manual provision of adjustments and/or values by a user via the UI infrastructure 360 of the investigative platform 300 or via a configuration file, and/or an environment variable.

The dynamic library replacement technique described herein is configured to replace (in part or entirely) libraries (e.g., original methods) of the user application 220 that exhibit inferior (e.g., slow) performance characteristics as compared with improved equivalent methods provided by the investigative platform 300 (e.g., client libraries and curated third-party libraries). Illustratively, the original methods are generic functions (e.g., string libraries, arithmetic operation libraries and the like) that are often employed (e.g., invoked) by the user application 220 and whose performance improvement may benefit many users. The technique improves the performance of the original methods by creating improved versions (e.g., faster, less memory utilization) of those methods which may be due to tool chains deployed (e.g., native code compilers vs. interpreters) and/or algorithmic improvements.

In an embodiment, the technique identifies the original methods for replacement by analyzing (e.g., comparative performance) traces captured from the user application 220 by the client library 320. The original methods deemed for replacement may be identified based on estimated performance improvements determined from the comparative performance analysis of the captured traces 450 as compared to pre-determined performance profiles of the client library and the curated third-party libraries. Analysis may involve traces and historic performance profiles from multiple user applications. Performance of the user application may be improved by replacing the original methods, e.g., typically implemented in an interpreted programming language such as Ruby or Python, with improved (e.g., faster) versions of the methods typically implement with native code tool chains, e.g., in a compiled programming language such as C or C++, and/or with algorithmic improvements (e.g., better order of runtime). These improved methods are thus usually embodied as fast, native code methods that may be included in the dynamic configuration 420 as default replacement methods provided by the client library 320 for equivalent user application methods. In addition, as further improvements to the original methods are identified and developed, those improvements may be automatically pushed (loaded) into the dynamic configuration 420, e.g., by the agent 330 and/or APS infrastructure 350, so that the next time the user application 220 runs, the original methods may be automatically replaced with improved, faster versions of the methods. Notably, the replacement methods may include improved user implemented methods or libraries as well as client library methods and curated third-party methods.

The technique also measures the relative performance of the original methods/functions and verifies behavior (performance improvement) of the improved methods (from the client and third-party libraries as well as improved user libraries) provided by the investigative platform 300. Illustratively, the client library 320 maintains a reference (i.e., memory address) to the original method of the user application 220 and executes it on a sample of method calls. Notably, if the original methods are pure functions (i.e., do not cause side-effects, such as data modification) then both versions (original method and improved method) may be executed and trace captured for provided data (i.e., parameters/variable invoked with the original method) to enable precise performance comparison. During trace capture, the client library 320 collects performance information (e.g., method entry/exit timestamps to determine execution time, memory allocations, memory utilization, input/output utilization, kernel execution time, etc.) of methods and compares the performance information to pre-determined profiles for the client libraries and curated third-party libraries to determine performance improvement. The results of the comparison are analyzed to verify that the improved methods provided by the investigative platform 300 produce the same results as the original method of the user application 220 but with improved (e.g., faster) performance. Specific performance for any method may be monitored according to a fidelity (e.g., comparative performance improvement, such as average speedup, min/max, etc.) of the monitored method.

The improved method replacements (from the client and third-party libraries as well as improved user libraries) and estimated performance improvements may be graphically presented to the user via a user interface (UI) infrastructure of the investigative platform. The user may be notified of the performance improvements experienced as a result of the improved methods. The performance improvements, like any functionality of the investigative platform, can be separately enabled based on the dynamic configuration 420. Replacement of the improved methods may be defined in the dynamic configuration, which may be provisioned interactively via the UI infrastructure on a per-method, per-library or per-group basis, or as specified by the agent after retrieving a configuration file, an environment variable, etc. or from a configuration service, and/or applied according to a pattern match (e.g., regular expressions) for individual methods, groups of methods or whole libraries (e.g., "digest*").

Figure 5:
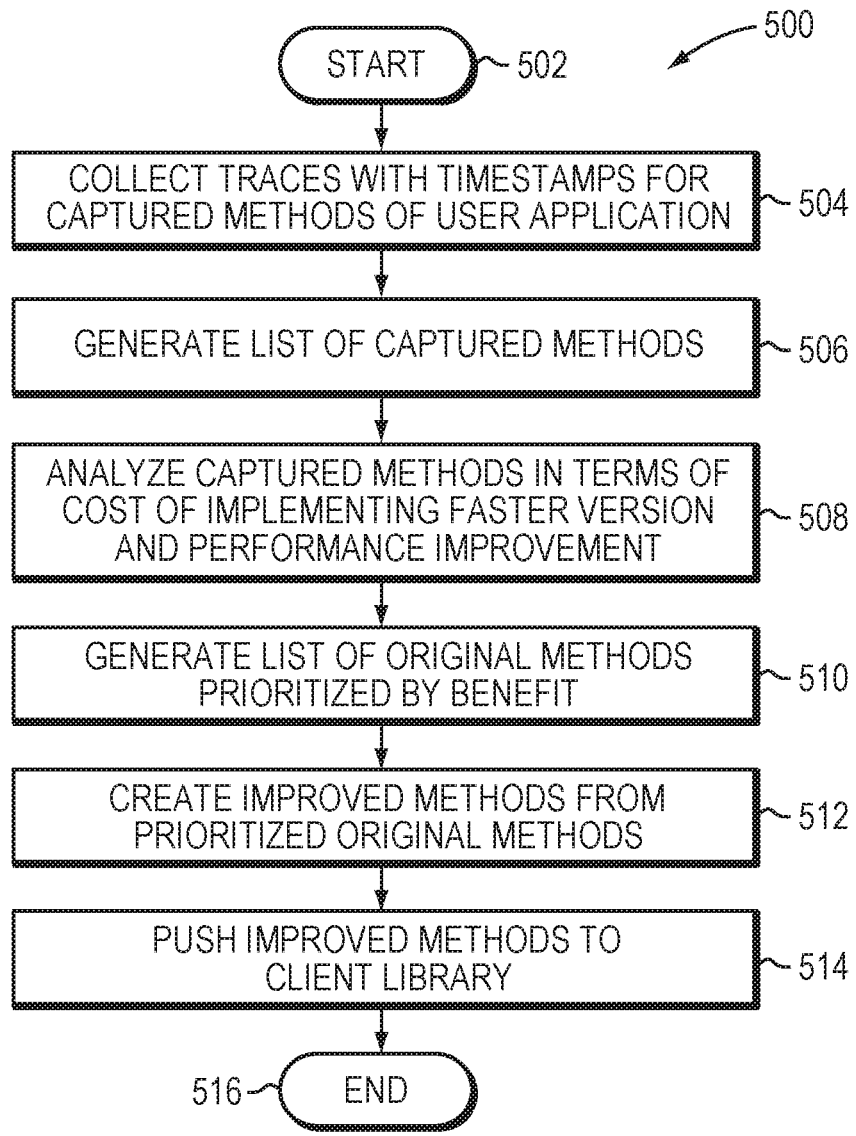
FIG. 5 is an example simplified procedure for improving original methods of application libraries in accordance with a dynamic library replacement technique.

FIG. 5 is an example simplified procedure for improving original methods of application libraries in accordance with the dynamic library replacement technique. The procedure 500 starts at block 502 and proceeds to block 504 where the client library collects traces with timing information (timestamps) for the captured methods of the user application. In block 506, the client library generates a list of the captured user application methods (e.g., similar to the curated list) sorted by potential benefit. Illustratively, the potential benefit is calculated as the total time spent in each method, wherein the total time is calculated as the product of the number of calls and average time per call (other statistical measures may be used such as median time per call). At block 508, the captured methods are analyzed in terms of (estimated) cost of implementing an improved (faster) version of each method, as well as an expected performance improvement of the method. Note that improving performance of a method is often a tradeoff of resources (e.g., processing time vs. memory utilization) as well as programmer resources.

At block 510, a list of original methods is generated that sorts and prioritizes the original methods by (expected) benefit, wherein the expected benefit is the total time divided by the average expected speedup. At block 512, the improved methods are selected from the prioritized original methods as candidates for replacement and implemented and, at block 514, the improved methods are pushed to the dynamic configuration of the client library to implement the replacement of the original methods on-the-fly. The procedure then ends at block 516. As such, the technique permits runtime method and library replacement without interrupting the user application (e.g., without halting the application process) or production environment.

Figure 6:
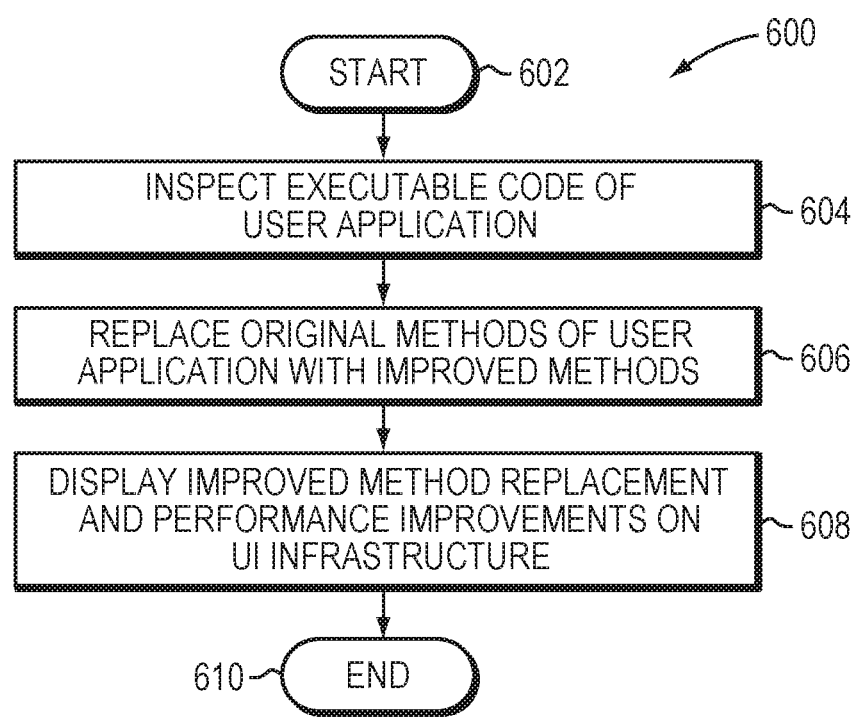
FIG. 6 is an example simplified procedure for replacing the original methods of the application libraries with improved methods in accordance with the dynamic library replacement technique.

FIG. 6 is an example simplified procedure for replacing the original methods of the application libraries with improved methods in accordance with the dynamic library replacement technique. The procedure 600 starts at block 602 and proceeds to block 604 where the client library inspects the executable code of the user application to determine portions of the code to instrument based on the heuristics of the dynamic configuration. As noted, the client library runs in a process of the user application and has the ability to not only inspect but also modify the executable code. In an embodiment, a jump table having entries with addresses of the original methods may be modified to reflect addresses of the improved methods so as to invoke the improved methods in lieu of the original methods, which may be used during the callback. When inspecting (walking through) the executable code, the client library replaces the original methods of the user application (as specified by the heuristics, such as a regular expression pattern match for individual methods, groups of methods or whole libraries) with improved versions of the methods as specified in the dynamic configuration (block 606) using, inter alia, forms of indirection (e.g., the jump table) or modification of the executable code (e.g., replacing an address of a machine code call instruction). Replacement of the improved methods may be defined in the dynamic configuration or interactively via the UI infrastructure. At block 608, the improved method replacements and estimated performance improvements may be graphically displayed to the user on a user interface (UI) infrastructure of the investigative platform on a per-method, per-library or per-group basis and/or applied according to a pattern match (e.g., regular expressions) for individual methods, groups of methods or whole libraries (e.g., "digest*"). The procedure then ends at block 610. Note that the replacement libraries may continue to be monitored with performance reported including continued comparative performance with the replaced user application methods based on historical trace captures. Specific performance for any method may be monitored according to a fidelity (e.g., comparative performance improvement, such as average speedup, min/max, etc.) of the monitored method.

Advantageously, the dynamic library replacement technique provides on-the-fly production-level profiling to enable automatic replacement of slower original methods (functions) in the user application with improved (e.g., faster) versions of the methods provided by the investigative platform. In addition, the technique enables replacement of targeted methods (original methods) of the user application with specific improved methods, as opposed to replacement of entire libraries of methods by conventional approaches, which may be costly and burdensome as well as being difficult in production environments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   instrumenting executable code of an application to capture traces of execution of the application on a computer node having a memory, wherein instrumenting of the executable code is in accordance with a dynamic configuration for replacement of the executable code by improved executable code;
   establishing one or more callbacks as one or more event-driven capture intervals of the traces during execution of the application;
   capturing the traces of execution during the capture interval via the callback;
   analyzing, based on the captured traces of execution, comparative performance of the executable code with a performance profile of the improved executable code based on a prioritized list of the executable code by expected benefit, wherein the expected benefit is a total time of execution divided by an average expected speedup;
   determining whether the improved executable code has improved performance over the executable code based on the analysis of the comparative performance; and
   in response to determining that the improved executable code has improved performance over the executable code, modifying execution of the application to invoke the improved executable code in lieu of the executable code while the application remains running.

2. The method of claim 1, wherein the comparative performance includes one or more of an execution time, a memory utilization, or a time spent in a kernel of an operating system hosting the application.

3. The method of claim 1, wherein modifying execution of the application to invoke the improved executable code in lieu of the executable code further comprises:
   using a jump table to invoke the improved executable code when the application invokes the executable code.

4. The method of claim 3, wherein the jump table is used to invoke the improved executable code via the callback during the capture interval.

5. The method of claim 3, further comprising:
   continuously monitoring the improved executable code by trace capture via the callback.

6. The method of claim 5, further comprising:
   providing performance comparison based on captured traces of the continuously monitored improved executable code with historical performance of the executable code.

7. The method of claim 1, wherein analyzing, based on the captured traces of execution, comparative performance further comprises:
   comparing a first trace of execution of the executable code for a set of data with a second trace of execution of the improved executable code for the set of data, wherein the executable code and improved executable code are invoked during a same capture interval with the set of data via the callback.

8. The method of claim 1, further comprising:
   presenting a visualization of the comparative performance of the executable code and the improved executable code via a user interface.

9. The method of claim 1, further comprising:
   sending the traces to an agent process for analysis of the comparative performance of the executable code with the performance profile of the improved executable code, wherein the agent process determines whether the improved executable code has improved performance over the executable code, and wherein the agent process and application execute on a same operating system.

10. The method of claim 1, wherein the performance profile is pre-determined for third-party libraries.

11. A non-transitory computer readable medium including program instructions for execution on one or more processors, the program instructions configured to:
    instrument executable code of an application to capture traces of execution of the application on a computer node having a memory, wherein the executable code is instrumented in accordance with a dynamic configuration for replacement of the executable code by improved executable code;
    establish one or more callbacks as one or more event-driven capture intervals of the traces during execution of the application;
    capture the traces of execution during the capture interval via the callback;
    analyze, based on the captured traces of execution, comparative performance of the executable code with a performance profile of the improved executable code based on a prioritized list of the executable code by expected benefit, wherein the expected benefit is a total time of execution divided by an average expected speedup;

determine whether the improved executable code has improved performance over the executable code based on the analysis of comparative performance; and in response to determining that the improved executable code has improved performance over the executable code, modify execution of the application to invoke the improved executable code in lieu of the executable code while the application remains running.

12. The non-transitory computer readable medium of claim 11, wherein the comparative performance includes one or more of an execution time, a memory utilization, or a time spent in a kernel of an operating system hosting the application.

13. The non-transitory computer readable medium of claim 11, wherein the program instructions configured to modify execution of the application are further configured to:

use a jump table to invoke the improved executable code when the application invokes the executable code.

14. The non-transitory computer readable medium of claim 13, wherein the jump table is used to invoke the improved executable code via the callback during the capture interval.

15. The non-transitory computer readable medium of claim 13, wherein the program instructions are further configured to:

continuously monitor the improved executable code by trace capture via the callback.

16. The non-transitory computer readable medium of claim 15, wherein the program instructions are further configured to:

provide performance comparison based on captured traces of the continuously monitored improved executable code with historical performance of the executable code.

17. The non-transitory computer readable medium of claim 11, wherein the program instructions configured to analyze the comparative performance are further configured to:

compare a first trace of execution of the executable code for a set of data with a second trace of execution of the improved executable code for the set of data, wherein the executable code and improved executable code are invoked during a same capture interval with the set of data via the callback.

18. The non-transitory computer readable medium of claim 11, wherein the program instructions are further configured to:

present a visualization of the comparative performance of the executable code and the improved executable code via a user interface.

19. The non-transitory computer readable medium of claim 11, wherein the performance profile is pre-determined for third-party libraries.

20. A system comprising:

a node including a processor and a memory, the memory including an application having executable code with program instructions configured to, instrument the executable code to capture traces of execution of the application according to a dynamic configuration for replacement of the executable code by improved executable code;

establish one or more callbacks as one or more event-driven capture intervals of the traces during execution of the application;

capture the traces of execution during the capture interval via the callback;

analyze, based on the captured traces of execution, comparative performance of the executable code with a performance profile of the improved executable code based on a prioritized list of the executable code by expected benefit, wherein the expected benefit is a total time of execution divided by an average expected speedup;

determine whether the improved executable code has improved performance over the executable code based on the analysis of comparative performance; and in response to determining that the improved executable code has improved performance over the executable code, modify execution of the application to invoke the improved executable code in lieu of the executable code while the application remains running.

* * * * *